INVENTOR.
FRITZ E. SACHERS

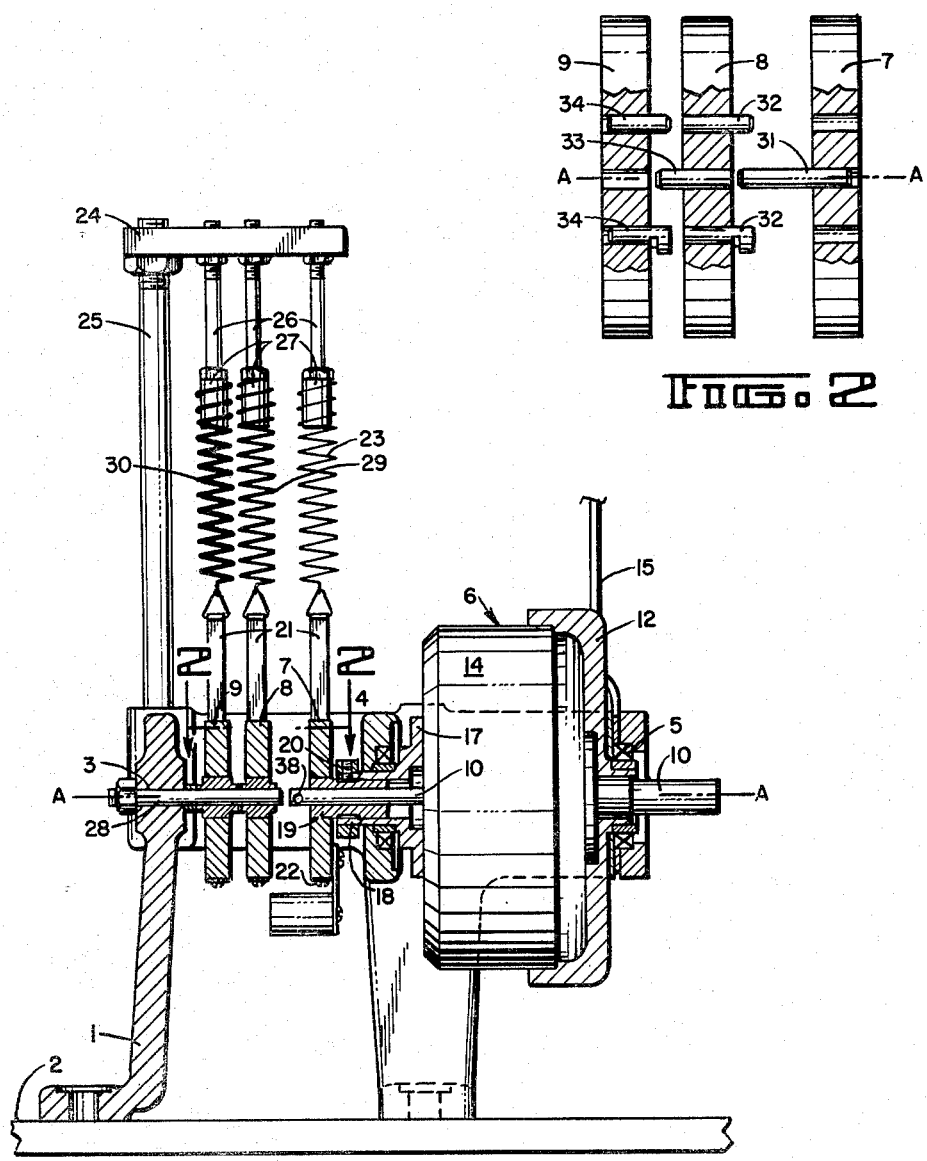

March 30, 1965

F. E. SACHERS 3,175,393

FORCE MEASURING APPARATUS WITH CUMULATIVE
RANGES OF MEASUREMENT

Filed Sept. 17, 1962

INVENTOR.
FRITZ E. SACHERS

BY
ATTORNEYS.

United States Patent Office 3,175,393
Patented Mar. 30, 1965

3,175,393
FORCE MEASURING APPARATUS WITH CUMU-
LATIVE RANGES OF MEASUREMENT
Fritz E. Sachers, New York, N.Y., assignor to
Aero-Chatillon Corporation
Filed Sept. 17, 1962, Ser. No. 224,190
3 Claims. (Cl. 73—134)

The invention relates to force measuring apparatus and has special application to the measurement of dynamic and static torque as by absorption dynamometers but is applicable to other forms of force measuring devices as well.

The principal problem to the solution of which the present invention is addressed, has arisen in connection with absorption dynamometers of the type employing an electromagnetic brake, and the principal embodiment of the invention which will be particularly described herein, will disclose the application of my invention to such type of dynamometer. In one previous commercial form of such apparatus, the electromagnetic brake operates in conjunction with what are known as "torque cells" containing torsion springs arranged to resist movement of the stator of the brake. In order to cover the operating range of the brake, it was necessary to manually interchange torque cells of different capacities, each of the different torque cells utilizing torsion springs of different capacities in order to cover different portions of the complete operating range. When using such apparatus to test motors of unknown torque, it frequently is necessary to resort to trial and error to determine the proper size of torque cell to be used. It has been a principal object of my invention to avoid the necessity for employment of such trial and error methods, and also to avoid the need for manual interchange of torque cells. Accordingly the force measuring apparatus embodying my invention is capable of automatically shifting the force measurement between two or more separate torque systems in such a manner that the first torque system which is brought into play will actuate the second and, as the force continues to increase, a third torque system may be actuated, and so on. The forces of the springs or other means of each torque system are cumulative so as to provide successive ranges of increasingly higher force measurement without requiring any special adjustment or attention by the operator. The successive ranges may be shown upon a single dial in which the indicating pointer passes from one range of measurement to the next. According to a preferred form of my invention as applied to the electromagnetic brake type of absorption dynamometer, the apparatus is completely reversible for measurement of torque in either the clockwise or counterclockwise direction of rotation.

In its general arrangement my force measuring apparatus comprises a member mounted to turn about a pivot axis, means for applying torque to such member from an external source (such as an electrical motor, hydraulic motor, turbine, air motor, or other unit to be tested), means for resisting the turning movement of the aforesaid member about the pivot axis, and means for indicating the extent of such turning movement. An essential feature of such apparatus resides in the particular construction of the aforesaid means for resisting the turning movement of the member, for example, the turning movement of the member represented by the stator of the electromagnetic brake. Such resisting means includes a plurality (two or more) of torque elements, each separately loaded against turning movement, and a lost motion clearance between successive torque elements. The stator or other member is permitted to move initially over a range in which its movement is resisted solely by a first one of the torque elements until at the end of the lost motion interval of the driving connection between said first torque element and a succeeding torque element, the movement of the member is resisted by both the first and succeeding torque elements over a second range of such movement. Thus the action of the two torque elements is cumulative in the sense that both such elements operate together through the second range. A third or any other number of additional ranges may be employed as desired, using a lost motion driving connection between the torque elements of the successive ranges.

Referring to the drawings in which I have illustrated the best mode contemplated by me for carrying out my invention:

FIG. 1 is a side elevational view, partly in central vertical section, of an apparatus constructed in accordance with my invention.

FIG. 2 is a detail horizontal sectional view taken as indicated at 2—2 in FIG. 1.

Figure 3:
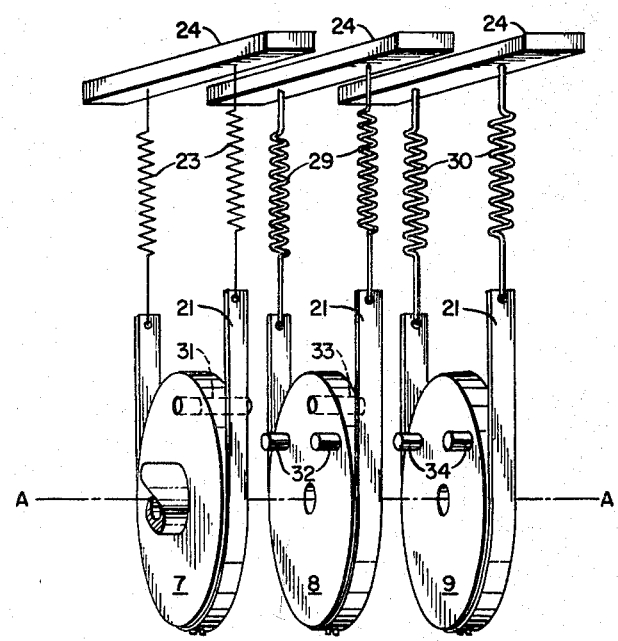
FIG. 3 is a diagrammatic exploded perspective view showing the three torque elements of FIGS. 1 and 2.

In the preferred embodiment shown in the drawings, a frame 1 fixed to a base 2 includes bearings 3, 4 and 5 in which are supported the rotating elements of the apparatus including an electromagnetic brake indicated generally at 6, and the series of discs 7, 8 and 9 comprised in the torque elements of the device. The pivot axis of the several elements having rotative movement is indicated at A—A. The input shaft 10 of the dynamometer is suitably coupled to the motor or other unit 11 to be tested. Freely mounted on the input shaft 10 is a bracket 12 in which is provided a recess 13 to receive the stator 14 of the electromagnetic brake 6. Indicating means such as the pointer 15, extends from bracket 12 over the top of an indicating dial 16. (In FIG. 5 pointer 15 is shown as extending from a connection at the rear of the electromagnetic brake, in this respect being a modification of the structure indicated in FIG. 1. Input shaft 10 is keyed to the rotor of the electromagnetic brake 6 which may be of any well known construction such as the commercially available electromagnetic hysteresis or magnetic particle brake. Fixed to the stator 14 of the brake is a bracket 17 having a sleeve 18 surrounding shaft 10, sleeve 18 being carried in bearings 4 of the supporting frame 1. Sleeve 18 is fixed to another sleeve 19 as by means of a set screw 20, sleeve 19 being freely rotatable with respect to shaft 10. Keyed to sleeve 19 is the disc 7 of a first torque element. A metal tape 21 is wrapped around the lower half of disc 19 and affixed thereto as by means of a screw 22. The ends of tape 21 are secured to coil springs 23 (cf. FIG. 3) which in turn are secured to a plate 24 fixed to a pair of mounting rods 25 extending upwardly from the frame 1. Mounting screws 26 and attached spring holders 27 provide means for calibrating the springs to the desired initial tension.

In line with shaft 10 is a shaft 28 mounted in frame 1. Freely mounted on shaft 28 are the discs 8 and 9 of a second and third set of torque elements, the construction of which is substantially similar to that of the one already described. In the construction shown the springs 29 of the second torque elements are heavier than the springs 23 of the first torque element, and the springs 30 of the third torque element are heavier than the springs 29.

With reference to FIG. 2, I shall now describe the lost motion driving connection between the discs 7, 8 and 9 of the successive torque elements. This driving connection may conveniently be secured by a series of cooperating drive pins. In the construction shown, a single pin 31 extends rearwardly from the upper portion of disc 7. A pair of pins 32 extend from the opposite face of disc 8 and are mounted therein at the same radial distance from the pivot axis A—A as in the pin 31 of disc 7 so that as disc 7 rotates in one direction or the other, the pin 31 will engage one of the pins 32 in a manner to drive disc 8 from disc 7. Similarly, a single pin 33 extends rearwardly from disc 8 for engagement with either of the pins 34 extending from the opposite side of disc 9 whereby after the clearance between pin 33 and one of the pins 34 has been taken up, disc 9 will be driven from disc 8.

The clearances between pins 31 and 32 on the one hand, and pins 33 and 34 on the other, are predetermined to permit movement of the stator 14 of the brake initially over a range in which its movement is resisted solely by the first torque element until at the end of the lost motion interval of the driving connection between the first torque element and the succeeding torque element, the movement of stator 14 is resisted by both the first and succeeding torque elements over a second range of such movement. The indicating dial 16 has indicia 35 calibrated to the several ranges, in this case three ranges for a clockwise rotation and three ranges for counterclockwise rotation. As the pointer moves from the zero position shown at the top of FIG. 4, it will pass into or through the first range *a* in which movement is resisted solely by the first torque element or "cell". Then as the load increases, the pointer will enter the second range *b* in which the movement of the stator 14 is resisted by the first and second torque elements or cells. Similarly, as the load increases still further, the pointer will pass into the range *c* where we have the cumulative resistance of the three torque units. It will be understood that the pairs of springs 23, 29 and 30 would ordinarily be placed under initial tension and that upon rotation of the discs the action will cause one spring of a pair to shorten as the other lengthens so that the net spring loading will be the algebraic sum of the increased tension on the one spring and the decreased tension on the other.

Figure 4:
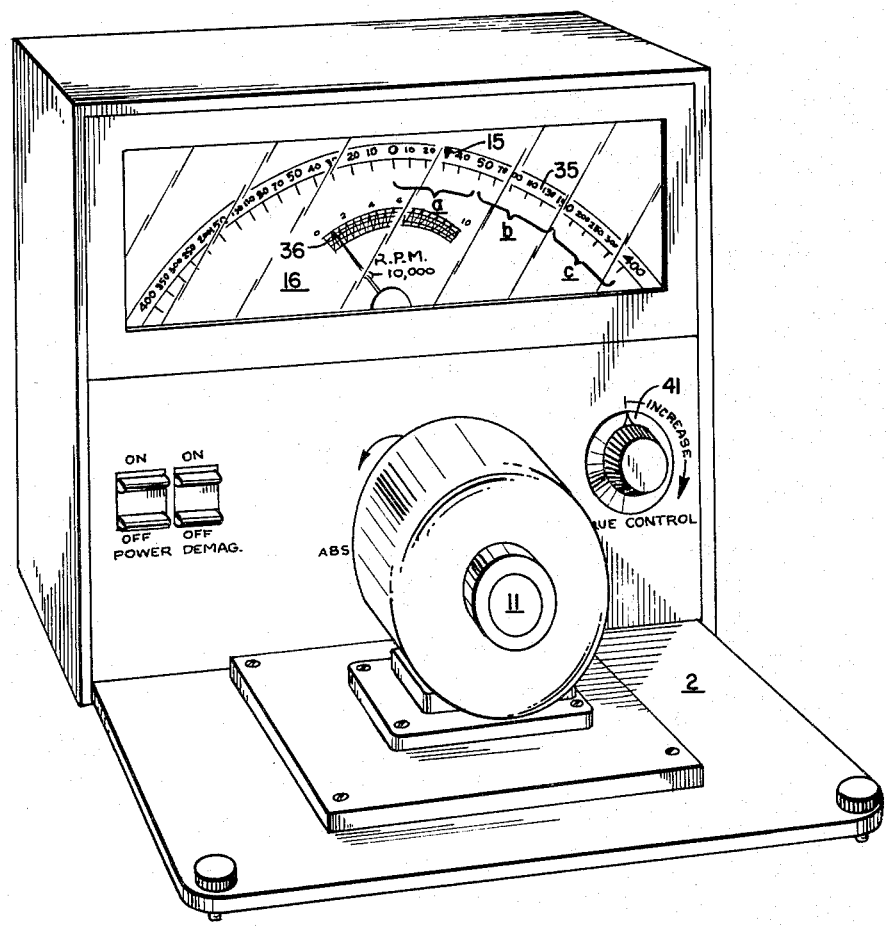
FIG. 4 is a perspective view of an absorption dynamometer embodying the apparatus of FIGS. 1 and 2 coupled to a motor that is to be tested.
Figure 5:
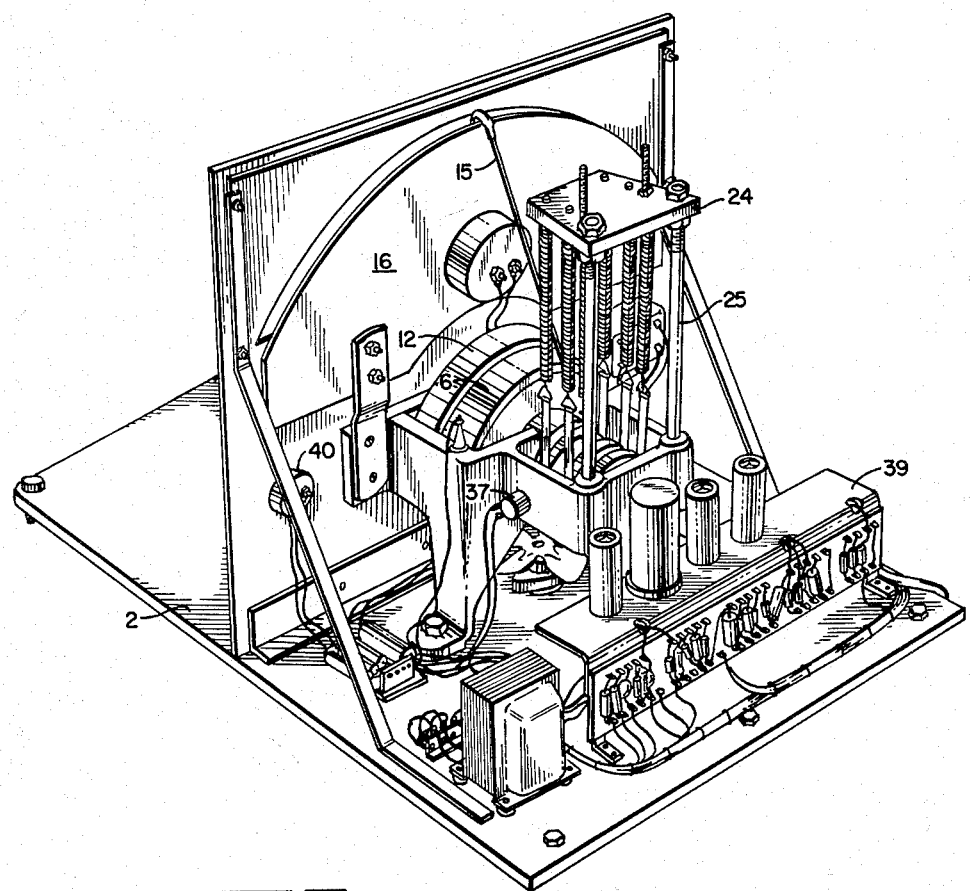
FIG. 5 is a perspective view of the dynamometer of FIG. 4 with the outer case removed, viewing the mechanism from the rear.

Suitable means may be provided for measuring and indicating the speed in r.p.m. of the input shaft or of the equal speed of the output shaft of the motor or other unit being tested; for example, a standard photoelectric tachometer, the indicating scale of which may conveniently be located as shown at 36 in FIG. 4. In FIG. 5 the photoelectric beam is projected from a conventional source as at 37, the beam passing through an aperture 38 in the shaft and being interrupted intermittently by the solid portion of the shaft as the latter rotates. Conventional means such as the electronic power unit 39, FIG. 5, may be used to activate the electrical coil of the electromagnetic brake 6 through a torque control potentiometer 40 which may conveniently be operated by a knob 41 on the front panel of the dynamometer. The brake 6 may be of either the hysteresis type or magnetic particle type, both of which are well known and available commercially.

Operation

In operation the dynamometer is attached to a suitable source of electric power and the motor 11 to be tested likewise is connected to its appropriate power source and provided with a mounting on the base 2 of the instrument in the manner indicated in FIG. 4, its shaft being connected to input shaft 10, FIG. 1, by means of a suitable flexible coupling. The power is then turned on and a suitable time allowed for the circuit to warm up, after which the motor to be tested is energized.

Next the operator turns the torque control knob 41 until the desired torque is indicated by the pointer 15 against the dial 35. When this torque is reached, the operator reads the r.p.m. on dial 36 or measures the r.p.m. by the use of a separate tachometer as desired. In my preferred construction the speed indicator is formed as an integral part of the instrument as shown.

In operation, the motor under test drives the rotor (not shown) of the brake. The magnetically coupled stator 14 attempts to follow the rotor but is restricted by the action of one or more of the sets of springs 23, 29 and 30. The magnitude of the reactive force exerted by the springs is transmitted to the pointer 15 and indicated by the position of the pointer on the dial 35 which may, for example, be calibrated in inch ounces or inch pounds. The corresponding tachometer reading may then be used to translate the force into horsepower in accordance wih standard prony brake procedure.

As the dynamometer measures the increasing reactive force, the first torque system 7, 21, 23 actuates the second 8, 21, 29, and, as the force continues to increase, the third torque system 9, 21, 30 is actuated, thus accumulating the forces of the three sets of springs. This multiple torque system may be used not only in conjunction with an electromagnetic brake but also in conjunction with a conventional prony brake, an hydraulic brake, or other desired forms of braking mechanisms. Further, the multiple torque system may be adapted to use with weighing scales.

Operation of the electromagnetic brake itself is well known and need not be particularized, except for a general statement. Assuming a brake of the hysteresis type, we have an input shaft 10 with a disc attached that is rotated within the stator 14. Passing current through the stator windings creates a hysteresis effect which tends to restrain the rotor. The amount of current supplied to the stator windings determines the magnitude of the restraining force. The stator is pivoted in ball bearings and attempts to follow the rotation of the input shaft but is restrained by a system of calibrated balanced springs. A slip is thereafter introduced between the input and stator which is measured by the spring balance. Energy produced by the motor is converted to heat and dissipated by the brake. Operation of the photoelectric tachometer is conventional. A beam of light is transmitted from the source 37 to a photoelectric cell. The beam is interrupted as the shaft rotates in the manner already described. An amplifier shapes the resultant pulse, regulates and converts it to a current pulse which is then averaged by the meter circuit.

The terms and expressions which I have employed are used in a descriptive and not a limiting sense, and I have no intention of excluding equivalents of the invention described and claimed.

I claim:

1. In force measuring apparatus comprising a member mounted to turn about a pivot axis, means for applying torque to said member from an external source, means for resisting turning movement of said member about the pivot axis, and means for indicating the extent of such turning movement, the construction in which the resisting means includes a plurality of torque elements each separately loaded against turning movement, and a lost motion driving connection between successive torque elements having a predetermined lost motion clearance between successive torque elements to permit movement of said member initially over a range in which its movement is resisted solely by a first one of the torque elements until at the end of the lost motion interval of the driving connection between said first torque element and a succeeding torque element the movement of said member is resisted by both the first and succeeding torque elements over a second range of such movement.

2. In force measuring apparatus comprising an electromagnetic brake, an input shaft arranged to drive the rotor of said brake and the stator of the brake being mounted for limited rotative movement around the axis of said input shaft, means for resisting such rotative movement of the stator, and means for indicating the extent of such rotative movement, the construction in which the resisting means includes a plurality of torque elements each separately loaded against turning movement, and a lost motion driving connection between successive torque elements having a predetermined lost motion clearance between successive torque elements to permit movement of said stator initially over a range in which its movement is resisted solely by a first one of the torque elements until at the end of the lost motion interval of the driving connection between said first torque element and a succeeding torque element the movement of said stator is resisted by both the first and succeeding torque elements over a second range of such movement.

3. In force measuring apparatus comprising an electromagnetic brake, an input shaft arranged to drive the rotor of said brake and the stator of the brake being mounted for limited rotative movement around the axis of said input shaft, means for resisting such rotative movement of the stator, and means for indicating the extent of such rotative movement, the construction in which the resisting means includes a plurality of discs mounted for limited rotative movement about a common axis, a lost motion driving connection between successive discs having a predetermined lost motion clearance between successive discs, and spring means arranged to load each of said discs separately, the predetermined lost motion clearance between successive discs permitting movement of said stator initially over a range in which its movement is resisted solely by the spring means associated with a first one of said discs until at the end of the lost motion interval of the driving connectiong between said first disc and a succeeding disc the movement of the stator is resisted by the springs associated with the first and succeeding discs over a second range of such movement.

References Cited by the Examiner
UNITED STATES PATENTS

| | | | |
|---|---|---|---|
| 2,043,147 | 6/36 | Bestoso | 73—135 |
| 2,674,121 | 4/54 | Gorman | 73—397 X |
| 2,744,409 | 5/56 | Wintle et al. | 73—134 |
| 2,785,568 | 3/57 | Schultz et al. | 73—134 |

FOREIGN PATENTS

| | | |
|---|---|---|
| 571,213 | 8/45 | Great Britain. |

RICHARD C. QUEISSER, *Primary Examiner.*

JOSEPH P. STRIZAK, *Examiner.*